US010054188B2

United States Patent
Hermann et al.

(10) Patent No.: US 10,054,188 B2
(45) Date of Patent: *Aug. 21, 2018

(54) SPRING FUNCTIONAL COMPONENT FOR A HYDROELASTIC BEARING AND A HYDROELASTIC BEARING

(71) Applicant: Anvis Deutschland GmbH, Steinau an der Straβe (DE)

(72) Inventors: Waldemar Hermann, Jossgrund (DE); Dmitry Khlistunov, Bad Soden-Salmünster (DE)

(73) Assignee: ANVIS DEUTSCHLAND GMBH, Steinau an der Strasse (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/415,512

(22) PCT Filed: Jul. 19, 2013

(86) PCT No.: PCT/EP2013/002166
§ 371 (c)(1),
(2) Date: Jan. 16, 2015

(87) PCT Pub. No.: WO2014/012678
PCT Pub. Date: Jan. 23, 2014

(65) Prior Publication Data
US 2015/0192189 A1 Jul. 9, 2015

(30) Foreign Application Priority Data
Jul. 19, 2012 (DE) .................. 10 2012 014 318

(51) Int. Cl.
*F16F 13/14* (2006.01)
(52) U.S. Cl.
CPC ...... *F16F 13/1481* (2013.01); *F16F 13/1409* (2013.01)

(58) Field of Classification Search
CPC .... F16F 13/14; F16F 13/1481; F16F 13/1409; F16F 13/1463; F16F 1/38; F16F 1/3835; B60K 5/1208; B60K 5/1291
(Continued)

(56) References Cited

U.S. PATENT DOCUMENTS

| 4,749,173 A * | 6/1988 | Kanda | F16F 13/14 |
| | | | 180/312 |
| 7,306,209 B2 * | 12/2007 | Vossel | F16F 13/14 |
| | | | 267/140.13 |

(Continued)

FOREIGN PATENT DOCUMENTS

| DE | 103 15 645 A1 | 10/2004 |
| EP | 1 348 885 A1 | 1/2003 |

(Continued)

OTHER PUBLICATIONS

International Preliminary Report on Patentability and Written Opinion of the International Searching Authority issued in PCT Application No. PCT/EP2013/002166 dated Jan. 29, 2015.

(Continued)

*Primary Examiner* — Xuan Lan T Nguyen
(74) *Attorney, Agent, or Firm* — Brinks Gilson & Lione (57) ABSTRACT

A spring functional component for a hydroelastic bearing (1), comprising an inner mounting connection and comprising an outer mounting connection that radially surrounds the inner mounting connection, comprising a spring body which at least partially delimits at least two working chambers (21, 23) for receiving a damping fluid and which couples the inner mounting connection and outer mounting connection to one another in order to permit a relative movement between the inner mounting connection and the outer mounting connection, and comprising a supporting frame (7) which surrounds the inner mounting connection and which is composed of a rigid material such as plastic or (Continued)

metal, wherein each of the at least two working chambers (21, 23) issues into at least one radial opening which is open to the radially outer side of the spring functional component and which can be closed off by a connection part for coupling to the outer mounting connection, wherein at least one radially inwardly extending radial stop is fastened to a radial inner side (13) of the supporting frame (7) in order to limit the relative mobility of the mounting connections at least in a radial direction.

21 Claims, 7 Drawing Sheets

(58) Field of Classification Search
USPC ............. 267/292, 293, 64.11, 64.13, 140.11, 267/140.12, 140.13, 141.2
See application file for complete search history.

(56) References Cited

U.S. PATENT DOCUMENTS

| | | | |
|---|---|---|---|
| 9,422,999 B2 * | 8/2016 | Hermann | |
| 2003/0178754 A1 * | 9/2003 | Larmande | ........... F16F 13/1463 267/140.11 |
| 2004/0084601 A1 | 5/2004 | Kato | |
| 2007/0045918 A1 | 3/2007 | Thornhill | |
| 2007/0273076 A1 | 11/2007 | Endo | |

FOREIGN PATENT DOCUMENTS

| | | | | |
|---|---|---|---|---|
| JP | 01108434 A | * | 4/1989 | .............. F16F 13/14 |
| JP | 2008025755 A | | 2/2008 | |
| JP | 2009180238 A | * | 8/2009 | .......... F16F 13/1409 |
| WO | 2005043001 A1 | | 5/2005 | |

OTHER PUBLICATIONS

English Translation of International Preliminary Report on Patentability and Written Opinion of the International Searching Authority issued in PCT Application No. PCT/EP2013/002166 dated Jan. 29, 2015.

International Search Report and Written Opinion of the International Searching Authority issued in PCT Application No. PCT/EP2013/002166, dated Nov. 5, 2013 (13 pages).

Office Action issued in German Patent Application No. 10 2012 014 318.4, dated Apr. 10, 2013, 8 pages.

* cited by examiner

SPRING FUNCTIONAL COMPONENT FOR A HYDROELASTIC BEARING AND A HYDROELASTIC BEARING

CROSS REFERENCE TO RELATED APPLICATION

This application represents the National Stage entry of PCT International Application No. PCT/EP2013/002166 filed on Jul. 19, 2013, which claims the benefit of German Patent Application No. 10 2012 014 318.4 filed on Jul. 19, 2012, both of which are fully incorporated herein by reference.

BACKGROUND

The disclosure relates to a spring functional component for a hydroelastic bearing, in particular for application in a motor vehicle. The hydroelastic bearing can, for example, be applied for bearing an axle carrier or a control arm, in particular a transverse control arm. In case of an application as an axle carrier bearing, an assembly of several hydroelastic bearings, in particular of four hydroelastic bearings, is provided, which are to be mounted in four predetermined mounting positions on the motor vehicle. In the mounted operating condition, the hydroelastic bearings of the assembly are aligned such that the axial directions thereof correspond to a vertical direction.

The hydroelastic bearing is generally applied when a relative movement of a component subjected to an oscillating load, such as a motor vehicle component, relative to the vehicle body is to be permitted and dampened. The hydroelastic bearing provides for resetting spring forces due to the application of elastomer material as well as for dampening forces actively induced by means of dissipation losses inside the bearing.

Generally, the spring functional component has an interior mounting connection via which the bearing is to be mounted to a component subjected to an oscillating load, such as the vehicle body of a motor vehicle. Another component, such as a motor vehicle component to be fastened to the motor vehicle body, is usually attached to the spring functional component via an exterior mounting connection. Alternatively, a reversed connection of the spring functional component to the motor vehicle body and the motor vehicle component can be considered. A spring body couples the mounting connections to one another in order to permit a relative movability of the mounting connections. The spring body at least partially limits two working chambers for receiving a dampening fluid. The working chambers can be in fluid communication via a junction channel in order to permit for a fluid exchange between the working chambers at a predefined cross-sectional constriction in order to induce the dissipation losses through the flow between the working chambers at a predefined cross-sectional constriction. It is known to determine the dampening characteristics by setting the flow resonance of the working chamber arrangement.

In a hydroelastic bearing, it is necessary to keep the maximum amplitude of movement of the mounting connections relative to another within boundaries, in order to prevent an overshoot and, thus, structural damage of the spring body. Therefore, a radial elastomer stop is used, which is attached at the interior mounting connection side. It became apparent that radial stops lying at the interior mounting connection are either not sufficiently durable or that they are sufficiently rigid only when their planar extension is large enough. Such radial stops at the interior mounting connection side require enlarged installation space for the hydroelastic bearing in the axial direction. Alternatively, it can be intended to separately insert an elastomer radial stop into each respective working chamber at an inside of an exterior sleeve. For mounting the separate radial stops, this requires a support frame design having several pieces in order to provide an access to the interior of the working chamber.

It is an objective of the invention to overcome the disadvantages of the prior art, in particular to provide a hydroelastic bearing which is easy to manufacture and sufficiently durable.

SUMMARY

Therefore, a spring functional component for a hydroelastic bearing, in particular for fastening a motor vehicle component to a motor vehicle body, is provided. The spring functional component has an interior mounting connection for mounting the bearing in particular to a vehicle body, and an exterior mounting connection for mounting the spring functional component in particular to a motor vehicle component or to a sleeve which is to be fastened to the motor vehicle component, which sleeve may, for example, be designed as a one piece member being part of the motor vehicle component. The interior mounting connection can be formed by an interior armature of a rigid material, such as a plastic or metal material, such as aluminum. Alternatively, it is possible to realize the interior mounting connection exclusively by means of an aperture in a spring body of the hydroelastic bearing without utilizing a rigid interior armature. The exterior mounting connection can be the circumferential outside of the spring functional component, which can be designed such that it may be firmly pressed into a connection part, such as a bushing of the motor vehicle component. If the bushing is designed as an exterior armature of the hydroelastic bearing, separately with regard to the motor vehicle component, an operable hydroelastic bearing is realized by assembling the spring functional component according to the disclosure into the bushing. Furthermore, the hydroelastic bearing according to the disclosure has a sleeve-shaped support frame surrounding the interior mounting connection, the support frame of a rigid material, such as a plastic or metal material, such as aluminum. The support frame can be designed cylindrical, oval or polygonal, dependent on the configuration of the bearing. The support frame defines an axial direction and is realized as a ring-shaped, closed stiffening-sleeve for forming a sufficiently rigid cage structure which shall stabilize the shape of the spring body or render it more rigid. The support frame can form the exterior mounting connection or be essentially rigidly connected thereto. The spring functional component includes a spring body in particular of an elastomer material which partially limits at least two working chambers for receiving a dampening fluid. The working chambers can communicate with one another via a junction channel for permitting an exchange of the working fluid between the working chambers. The spring body couples the interior mounting connection to the support frame such that a relative movability of the interior mounting assembly relative to the support frame is permitted. Due to the elastic relative movability between the interior mounting connection and the support frame, the working chambers are deformed dependent on the load so that a dissipating fluid flow exchange between the working chambers is realized. The spring functional component has at least one radial aperture for each of the at least two working chambers being open with respect to its radial outside, into each of which one respective working chamber mounds. For closing the working chambers at the radial aperture of the spring functional component, a connecting part, such as an exterior armature of the hydroelastic bearing, for example, an exterior bushing, can be provided at an exterior mounting connection radially surrounding the support frame, the connecting part closing the radial aperture of the spring functional component fluid tight. The support frame has not only this function, it serves for stiffening the passage aperture of the spring functional part, and for allowing an access for shaping the interior space of the working chamber and each of the radial stops arranged therein. The exterior armature of the hydroelastic bearing or a bushing reception of the motor vehicle component to be borne, which bushing reception replaces the exterior armature, can also serve for sealing the working chambers at the radial aperture.

According to the disclosure, at least one radially inward extending radial stop is fastened on the radial inside of the support frame, which radial stop limits the relative radial movability of the mounting connections of the spring functional component in at least one radial direction. In one embodiment, at least one radial stop is arranged inside a working chamber and is surrounded by the working fluid in a functioning operating condition of the hydroelastic bearing. The radial stop arranged inside the working chamber influences the dampening characteristics of the hydroelastic bearing insofar as, upon stop-deformation of the radial stop, the spring stiffness of the hydroelastic bearing increases, wherein together with the deformation of the central stop, the interior volume of the working chamber is changed, which leads to a dampening fluid exchange flow between the working chambers.

The disclosure makes it possible to provide a hydroelastic bearing in a simple manner even for mass production, the hydroelastic bearing having a single-piece, sleeve-shaped support frame which renders the spring body more rigid, wherein a radial stop having a short or slight axial extension is positioned in a radial outside area of the working chamber. In spite of the short axial extension of the radial stop, a sufficient rigidity of the radial stop can be ascertained. Via the radial aperture, a shaping tool comes into the inside of the support frame between the location of the interior mounting connection and the location of the support frame, wherein the working chamber together with other elastomer parts of the radial stop are shaped simultaneously. In one embodiment, a radial stop is completely arranged inside the respective working chamber. The at least one radial stop can be formed from an elastomer material and is injected onto the inside of the support frame. In one embodiment, the at least one radial stop has a free stop end which, dependent upon the load of the hydroelastic bearing, is distanced to or comes into engagement with the interior armature. In one embodiment, the at least one radial stop is arranged in the respective working chamber essentially in the axial and/or radial center thereof.

In one embodiment, the spring body has at least two spring arms for frictionally or force-fittingly and elastically coupling the interior mounting connection to the support frame. The spring arms can be formed column-shaped and continuously so that the spring arms extend free of interruptions in contact with the interior mounting connection towards the inside of the support frame into contact with it. The spring arms are not formed fully circumferential but limited in the circumferential direction for providing a predetermined spring rigidity in the direction of extension of the spring arms. Offset in the circumferential direction with regard to the spring arms lies the at least one radial stop. The spring rigidity of the hydroelastic bearing is, due to the spring arms, more rigid in a main radial direction than in a secondary radial direction angularly offset from the main radial direction, the working chambers being arranged essentially in the secondary radial direction. The two spring arms extend diametrically to one another essentially in the main radial direction from the interior mounting assembly towards the inside of the support frame.

The radial stops attached to the inside of the support frame extend in one embodiment perpendicular with respect to the direction of extension (main radial direction) of the spring arms.

In order to provide for a very simple manufacturing of the hydroelastic bearing according to certain embodiments, the support frame has a pair of radial passages for each working chamber, which radial passages are arranged in particular in a radial direction diametrically opposite to one another, and the radial passages being essentially congruent with the respective radial aperture of the spring functional component, wherein the radial apertures may possibly be slightly smaller in their average cross-section than the radial passages due to an elastomer coating of the edge areas of the radial passages of the support frame. The pairwise radial passages are mirror-symmetrically on the outside of the support frame, in particular in their course through their strength of the stiffening sleeve. A rectilinear shaping tool being free of undercuts can be slipped along a rectilinear insertion direction through both radial passages. Then both the working chambers as well as the respective radial stop arranged therein can be shaped extending from the outside of the support frame in a single manufacturing step. Between the pairwise radial passages/radial apertures, the respective radial stop is arranged.

The pairwise radial passages are oriented with respect to one another such that the rectilinearly extending shaping tool which is free of undercuts can be inserted through both radial passages in a rectilinear insertion movement. After the injection procedure of the elastomer spring body, the rectilinear shaping tool can be pulled out in a direction opposite to the insertion direction via the radial passages, such that a large part of the inner wall of the working chamber, including the radial stops arranged therein, as well as the respective radial aperture, are shaped. A two-piece design of the support frame or a separate arrangement of a separately manufactured radial stop is not required. Rather, the at least one radial stop is unified with the spring functional component according to certain embodiments to a single-piece component including the spring body.

The pairwise radial passages can each include an axial edge arranged proximal to the axial axis of the sleeve-shaped support frame, the respective axial edges being arranged opposite one another in the insertion direction, wherein the axial edge extends rectilinearly, in one embodiment parallel with respect to the axial axis. Both of the opposite axial edges of the radial passages of the support frame are arranged such that, in case of an application of the interior armature as an interior mounting connection, the axial edges are arranged in an essentially tangential secant plane, the plane being tangential to the particularly cylindrical interior armature or at least passing it in a short radial distance. This means that, in the inserted condition of the shaping tool, a gap between the shaping tool and the interior armature can be formed for providing a contact-free movement of the stop end towards the interior mounting connection.

In one embodiment, the cross-section of the at least two working chambers is U-shaped in the axial direction of the support frame. The radial stop is surrounded by the U-legs of the U-shaped hollow space of the working chamber.

In one embodiment, the support frame is a cylindrical bushing or sleeve or a sleeve-shaped cage. The support frame can include two closed ring edge-sections, which revolve in a closed angular manner. The ring edge-sections can each form the axial end of the support frame. The ring edge-section can be shaped annularly. In one embodiment, the ring edge-sections are arranged diametrically opposite one another in the axial direction and are essentially dimensioned equally.

In one embodiment, the sleeve-shaped support frame has several, for example four, cross-struts which rigidly connect the ring edge-sections with one another. The cross-struts extend essentially in the axial direction and are rigidly connected to one another via the ring edge-sections. Two adjacent cross-struts can limit the at least one radial passage of the support frame in particular in the circumferential direction thereof and can form the axial edge of the radial passage, the axial edge extending rectilinearly in the axial direction.

The locally limited strengthening of the support frame (thickening) achieves, in particular with a constant free stop travel path between the stops, that the radial strength of the elastic radial stops in particular of an elastomer material is reduced. Also, a very stable stop force distribution via the radially outside radial stops on the outside support frame is ascertained, wherein the spring elastic dampening travel path can be kept small.

In a further embodiment, the support frame, in particular the one or two cross-struts, forms a radially inward projecting thickening. The thickening realizes the radially inward directed profile so that the radial distance of the inner surface of the thickening is significantly smaller than, for example, the radial distance of another cross-strut and/or of a ring edge-section of the support frame. The elastic radial stop is in one embodiment attached to the thickening. With the radially inward protruding profile of the support frame and, thus, a possible shortening of the radial distance towards the longitudinal axis of the support frame or with respect to the interior armature, it is possible to operatively plan radial stops and the free amplitude of movement thereof, which is not possible for a common support frame having a classical sleeve-shape with a constant wall cross-section. The radially inward protruding profile can be realized by means of an injection method, for example aluminum pressure die casting or plastics injection molding. At the inside of a sleeve-shaped support frame, a sequence of at least two projecting thickenings is formed in the circumferential direction. The at least two projecting thickenings form a respective stop-cross-strut to which an elastic radial stop is attached.

A spring arm coupling the support frame to the interior mounting connection is fastened to a cross-strut having no radial stop. A pair of support-cross-struts on which two spring arms are supported, in particular have essentially the same circumferential width along the axial direction. A clearance of the cross-strut seen in the radial direction in one embodiment corresponds to a clearance in the radial direction of an interior sleeve forming the interior mounting connection, in particular the outer diameter thereof.

In a further embodiment, the radial stop is attached to a cylindrical inside of a stop-cross-strut of the support frame. In one embodiment, a pair of radial stops is held by a pair of opposite stop-cross-struts. A pair of radially extending spring arms of the spring body is frictionally attached or force-fitted to a pair of oppositely arranged support-cross-struts for oscillatory and force-fittingly coupling the support frame to the interior mounting connection. In the circumferential direction, the stop-cross-strut and support-cross-strut are arranged in an alternating manner. An axial centerline of each cross-strut is offset with respect to the centerline of the adjacent cross-strut at an angle of 80° to 100°, and in a particular embodiment 90°. As described above, the circumferential width of support-cross-struts arranged across from one another can be equally large, wherein their clearance seen in the radial direction is slightly larger than the clearance of an interior sleeve which may possibly be applied.

In one embodiment, the stop-cross-struts and/or the support-cross-struts are arranged pairwise diametrically opposite one another. The stop-cross-struts as well as the support-cross-struts can be of essentially equal shape. The at least one radial passage is limited in the circumferential direction by one respective support-cross-strut and one respective adjacent stop-cross-strut circumferentially offset thereto, and in the axial direction by the ring edge-sections.

In a further embodiment, the support-cross-strut has a cylinder section-shaped inside. The radius of the inside can correspond to a distance to the axial axis of the spring functional component. A radial strength of the stop-cross-strut can be larger than the radial strength of the support-cross-strut. A radial distance of the stop-cross-strut towards the interior mounting connection can be shorter than the radial distance of the support-cross-strut.

In a further embodiment, a channel system for forming the fluid communication between the working chambers is formed on a cylindrical outside of the support frame, in particular of the support-cross-struts and/or the ring edge-sections. Therein it can be intended that the stop-cross-strut is free of channels of the channel system. In one embodiment, the ring edge-sections each have an annular groove on their outside, formed on the terminal side thereof in the axial direction, in which a protruding sealing bulge, particularly made of elastomer material, is arranged. The annular groove can be arranged in the ring edge-section axially adjacent to a channel run of the channel system. The sealing bulge serves for sealing the channel system in the axial direction. Arranging the sealing bulge in the circumferential annular groove provides for an assured circumferential sealing surface after the spring functional component is pressed into an exterior sleeve or exterior bushing. The protruding elastomer material of the sealing bulge can evade into the annular groove. This achieves that damaging the sealing bulge can be avoided when the spring functional component is pressed into an exterior sleeve.

In one embodiment, the spring body, the at least one radial stop, and possibly the sealing bulge, are injected as one elastomer piece, in particular onto the support frame, wherein in particular the spring arms of the spring body can also be injected onto an interior armature. In one embodiment, both the support frame, as well as an interior armature, can be completely embedded inside the spring body, wherein the support frame realizes stiffening of the elastomer body in particular along the radial outside thereof.

In one embodiment, the working chambers are arranged axially symmetrical with respect to a radial axis of the bearing. As indicated above, the working chambers along the open radial passage of the support frame as well as possibly the channel system provided on an outside of the support frame can be closed in a fluid-tight manner by a separate exterior armature. The outside of the support frame can be extensively or entirely covered by an elastomer coating for sealing the channel system provided therewith a connection part after insertion. The exterior mounting connection of the spring functional component can be formed by the elastomer coating.

In a further embodiment, the interior mounting assembly is formed by an interior sleeve. The interior sleeve can include a projection arranged in particular essentially centrally in the axial direction, wherein the projection is arranged diametrically opposite or across from the respective radial stop, and/or wherein the projection forms a stop engagement location. The stop engagement location can be flat and essentially free of curves. Additionally, the stop engagement location can have a lateral undercut so that the area of the stop engagement location is increased.

In one embodiment, the interior mounting assembly is completely embedded within a spring body which particularly on the radial inside thereof includes a reception for a component subjected to an oscillatory load, such as a motor vehicle component.

Furthermore, the disclosure relates to a hydroelastic bearing having a spring functional component. For realizing the hydroelastic bearing, the spring functional component is inserted into an exterior armature so that the at least two working chambers are closed in a fluid-tight manner at their radial apertures. The exterior armature can be a separate exterior sleeve or exterior bushing or be a corresponding reception in a motor vehicle component, the motor vehicle component being complementarily shaped with respect to the exterior mounting assembly of the spring functional component.

Further properties and features as well as advantages of the various embodiments are described herein.

BRIEF DESCRIPTION OF THE DRAWINGS

Further features, properties and advantages become apparent through the following description of certain embodiments by means of the associated figures, in which show.

DETAILED DESCRIPTION

Figure 1:
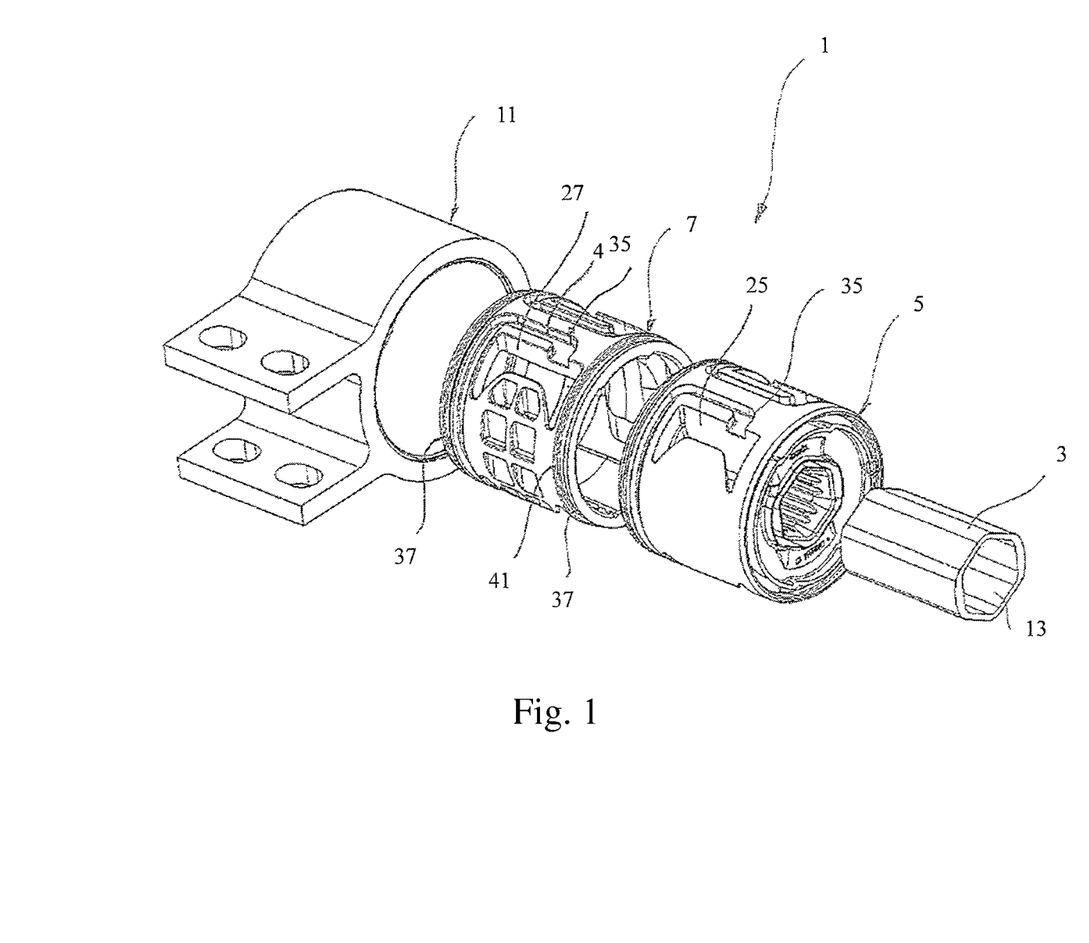
FIG. 1 is an exploded perspective view of an exemplary hydroelastic bearing.
Figure 2:
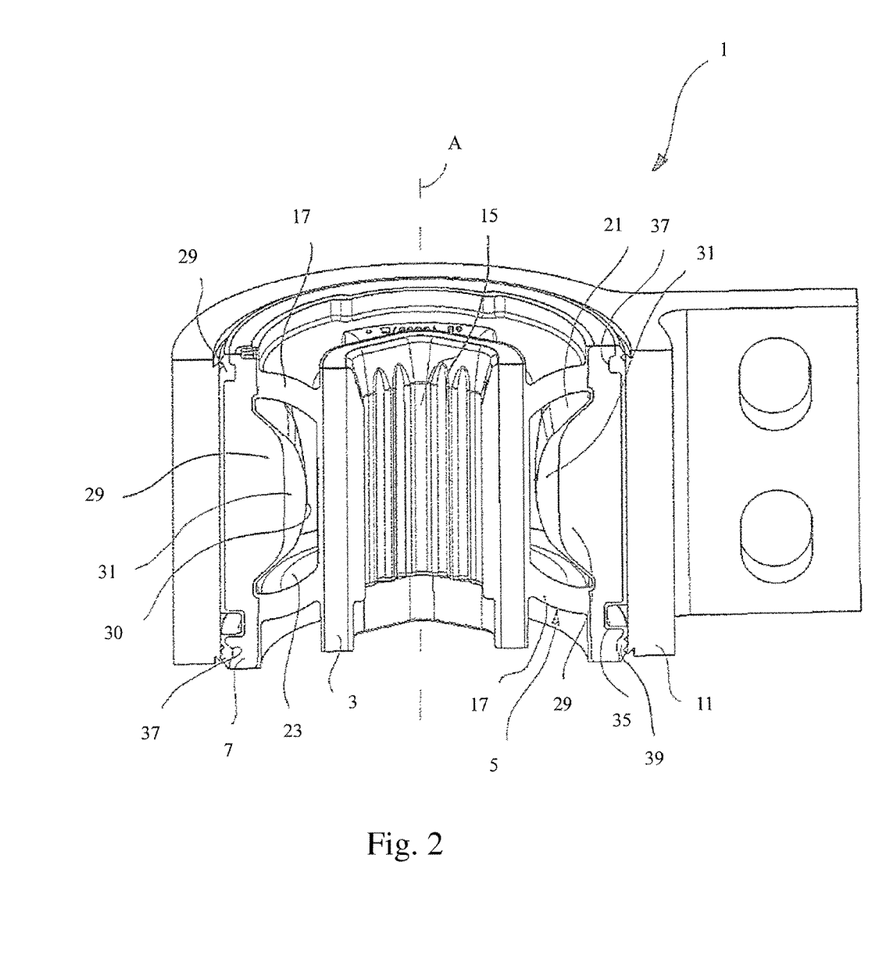
FIG. 2 is a perspective cross-sectional view of the hydroelastic bearing shown in FIG. 1.

In FIGS. 1 and 2, a hydroelastic bearing according to one embodiment is generally given reference numeral 1, the hydroelastic bearing including four main constituents: an aluminum interior sleeve 3, an elastomer spring body 5, a sleeve-shaped support frame 7, in a particular embodiment made of aluminum, like Silafont 36, which is generally produced as an injection part, for example by means of aluminum pressure die casting, or which may be injected molded from plastics, and an exterior sleeve 11 made of metal including two flange-plates for attaching the bearing 1 to a motor vehicle body (not illustrated).

Forming the support frame 7 as an injection part allows for a non-rotationally symmetrical design of the support frame, for example having radial interior profile contours in order to be able to design the support frame according to predetermined spring functions and/or stop functions for the spring functional component of the hydroelastic bearing. The interior sleeve 3, the elastomer spring body 5, and the support frame 7 form the spring functional component of the hydroelastic bearing 1, which is finished when the spring functional component is pressed into the exterior sleeve 11, as indicated in FIG. 2. The interior sleeve 3 serves on the motor vehicle side as a force-fitting location for application of force into the bearing 1. Via the interior sleeve 3, the bearing 1 is mounted to a component of a motor vehicle subjected to oscillating loads, such as a control arm or axle carrier.

The interior sleeve 3 has a polygonal circumference and is completely embedded inside the elastomer spring body 5, as shown in FIG. 2. On the inside 13 of the interior sleeve 3, several elastomer ribs 15 are formed for realizing a frictional or force-fitted engagement of the component which is to be coupled to the bearing 1.

Figure 3:
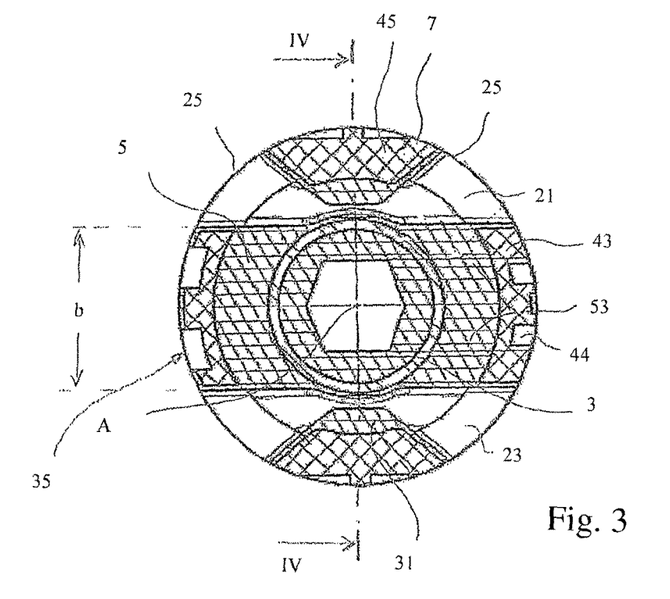
FIG. 3 is a cross-sectional view of an exemplary spring functional component for a hydroelastic bearing without an exterior armature along the cross-section line IV-IV according to FIG. 4.

The elastomer spring body 5 is formed sleeve-shaped and arranged concentrically with regard to the axial axis A between the interior sleeve 3 and the exterior sleeve 11. The elastomer spring body 5 is partially realized as a solid body and otherwise partially provided with cavities, the cavities realizing fluid-working chambers 21, 23. Each of the working chambers 21, 23 is limited in the direction of the axial axis A by a surrounding axial sidewall 28. In FIG. 3, the course of the working chambers 21, 23 in a radial direction is visible. Also visible in FIG. 3 is that the elastomer spring body 5 forms spring arms or columns 53 in the solid body area, the spring arms or columns 53 ensuring a frictional or force-fit supporting of the support frame 7 on the interior sleeve 3.

Into each of the working chambers 21, 23, a dampening fluid is filled. Each working chamber 21, 23 mounds at the radial outside of the elastomer spring body 5 and, thus, of the spring functional component into a radial aperture 25 which is closed fluid-tight by the exterior sleeve 11.

In order to provide the elastomer spring body 5 with a sufficient rigidity or stiffness especially on the mounting outside of the spring dampening component, the support frame 7 is essentially completely embedded in the elastomer spring body 5 in one embodiment. In order to realize the radial aperture 25 in the elastomer spring body 5, the support frame 7 has a radial passage 27 complementary in shape with regard to the radial aperture 25. The radial aperture 25 of the elastomer spring body 5, which radial aperture 25 is reinforced by the radial passage 27, has a U-shaped cross-section. The working chambers 21, 23 in their rectilinear radial course from one radial aperture 25 to the diametrically opposite one also have the U-shaped cross-sectional shape.

In each of the working chambers 21, 23, one respective radial stop 31 is formed, which is injected immediately to the inside of the support frame 7. As can be seen in FIG. 2, the radial stop 31 is arranged at a radially inward extending thickening 29 of the support frame 7, wherein the radial stop 31 continuously connects to the thickening 29. The round edge 30 of the radial stop 31 lies across from the interior sleeve 3, wherein the distance between the interior sleeve 3 and the round edge 30 allows a movement of the interior sleeve 3 relative to the support frame 7 unhindered by the radial stop 31. Upon stopping engagement of the radial stop 31 at the interior sleeve 3, the spring rigidity of the spring functional component changes for the radial direction in which the radial stop 31 extends. Also, through the deformation and the accompanying change of the inner volume of the working chambers 21, 23, the dampening characteristics of the hydroelastic bearing 1 are changed.

For shaping the working chambers 21, 23 as well as the radial stop 31, one respective rectilinear shaping tool (not illustrated) is inserted through the opposite radial passages 27. Afterwards, elastomer material is injected around the shaping tools in a single manufacturing step for forming the interior contour as well as the exterior contour of the elastomer body 5 which is stiffened by the support frame 7. The direction of insertion or insertion direction of the shaping tools and, thus, the longitudinal course of the working chambers 21, 23, lies essentially perpendicular with respect to the axial direction A. The working chambers 21, 23 and the radial stop 31 are shaped around or onto the support frame 7 in a common step of shaping, wherein in the course of each working chamber 21, 23 from one radial aperture 25 towards the opposite one, a uniform cross-section without undercuts in the insertion direction of the tool is achieved.

By arranging the radial stops 31 on the outside of the support frame 7, a relatively large stop material volume and a relatively large stop surface is realized, which has an advantageous effect for the durability of the radial stop 31.

For closing the radial apertures 25 and, thus, the working chambers 21, 23, the elastomer spring body 5 which is stiffened by the support frame 7, is pressed into the cylindrical interior reception of the exterior sleeve 11.

As shown in FIGS. 1 and 2, the elastomer spring body 5 and the support frame 7 have on the radial circumferential outside a channel system 35 which allows for fluid communication between the working chambers 21, 23 on the outside of the support frame 7.

At the axial terminal edge of the stiffening sleeve 7, adjacent to the channel system 35, a revolving or surrounding groove 37 is provided, in which a sealing bulge 39 of the elastomer spring body 35 is arranged. The groove 37 prevents damage of the sealing bulge 39 during pressing the elastomer spring body 5 into the exterior sleeve 11. The sealing bulge 39 provides for a revolving sealing surface between the elastomer spring body 5 and the inside of the exterior sleeve 11 for containable sealing the channel system 35 as well as the working chambers 21, 23.

Upon a deformation of the elastomer spring body 5 in the area of the working chambers 21, 23, a fluid exchange between the both of them occurs via the channel system 35, which exchange realizes the desired dampening losses. The amplitude of movement of the interior sleeve 3 relative to the stiffening sleeve 7 is limited in a radial direction in which the radial stops 31 are arranged.

Figure 4:
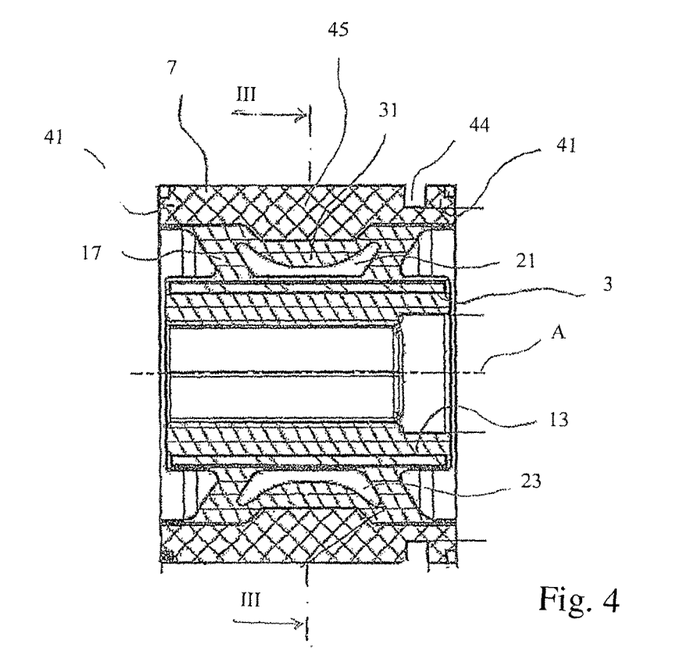
FIG. 4 is a cross-sectional view of the spring functional component shown in FIG. 3 along the cross-sectional line III-III.

In FIGS. 3 and 4, a spring functional component for a hydroelastic bearing 1 according to one embodiment is shown, wherein, for similar or identical components of the spring functional component according to FIGS. 1 and 2, the same reference numerals are used. The spring functional component according to FIGS. 3 and 4 differs from the one according to FIGS. 1 and 2 in that the interior sleeve 3 has a circular cylindrical cross-section. The elastomer spring body 5 has a hexagonal spring body reception on the radial inside of the interior sleeve 3.

Figure 5:
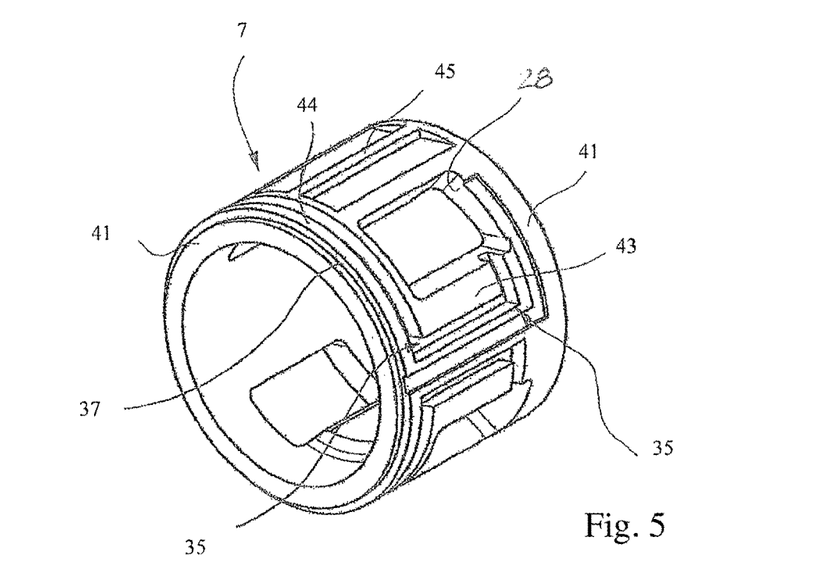
FIG. 5 is a perspective view of a sleeve-shaped support frame of the spring functional component shown in FIGS. 3 and 4.
Figure 6:
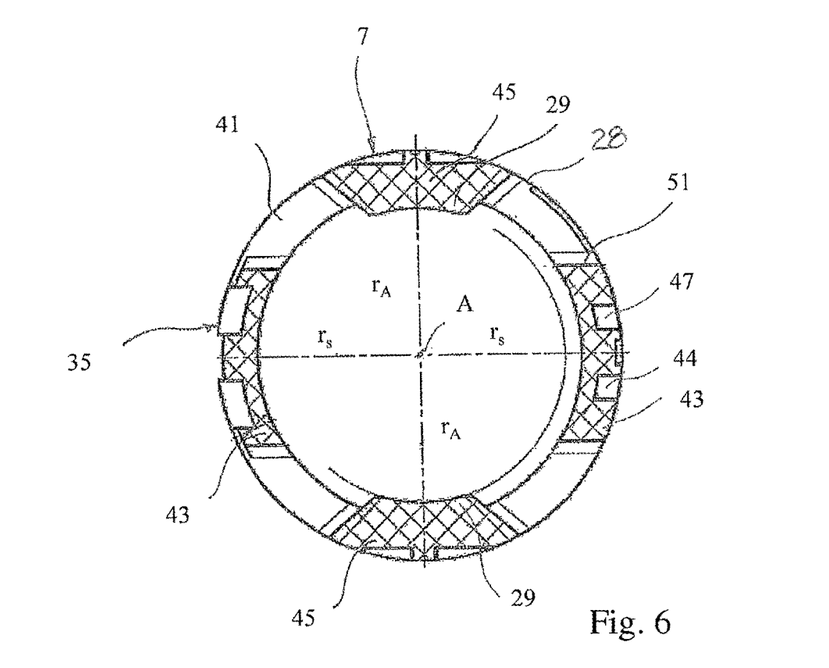
FIG. 6 is a cross-sectional view of the support frame of FIG. 5.

As can be seen in FIG. 3 in combination with FIGS. 5 and 6, the support frame 7 is formed by two annular ring edge-sections 41 as well as pairs of cross-struts 43, 45 connecting the ring edge-sections 41, which rigidly connect the ring edge-sections 41 to one another. The cross-struts 43, 45 serve as stop-cross-struts 45 and support-cross-struts 43.

As can be seen in FIG. 6, channels 44 being part of the channel system 35 are only provided in the support-cross-strut 43. No channels are formed in the stop-cross-strut 45. The stop-cross-strut 45 partially has a larger radial strength than the support-cross-struts 43, wherein the cylindrical outsides of both of the cross-struts 43, 45 are concentrically arranged in a common cylinder-plane with respect to the axial axis A. The distance of the partially cylindrical inside of the stop-cross-strut 45 with respect to the axial axis A is shorter than the distance of the partially circular cylindrical inside of the support-cross-strut 43.

As shown in FIG. 3, the support-cross-strut 43, when seen in a radial direction, has a clearance b, which essentially corresponds to the radial clearance of the interior sleeve 3. The radial passage 25 of the stiffening sleeve (support frame 7) is limited on the side of the support-cross-strut 43 by an axial edge 51 which is rectilinear in the longitudinal direction A, the projection of the axial edge 51 being arranged essentially tangential with respect to the outside of the interior armature or interior sleeve 3.

As can be seen in FIGS. 3 and 4, the radial stop 31 extends from the partially cylindrical inside of the thickened stop-cross-strut 45 radially inward towards the interior armature or interior sleeve 3, wherein in a load-free condition, a distance exists between the radial stop 31 and the opposite elastomer coating of the interior sleeve 3.

For realizing the working chambers 21, 23 as well as the shape of the elastomer spring body 5, a shaping tool (not illustrated) is used, which is inserted through the passages 27 without undercuts in the longitudinal direction of extension. In this embodiment, two opposite shaping tools are inserted to each respective passage, which shaping tools meet in the area of the radial passage. Afterwards, the elastomer spring body 5 is filled by injection for subsequently pulling out the shaping tools rectilinearly in the insertion direction. Meanwhile, the continuous spring arms or columns 53 are formed which extend from the support-cross-strut 43 to the interior sleeve 3.

Figure 7:
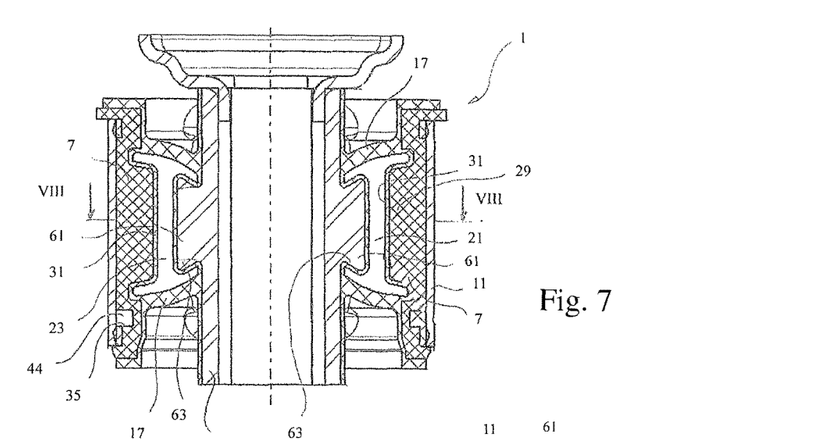
FIG. 7 is a cross-sectional view of a further embodiment of the hydroelastic bearing.
Figure 8:
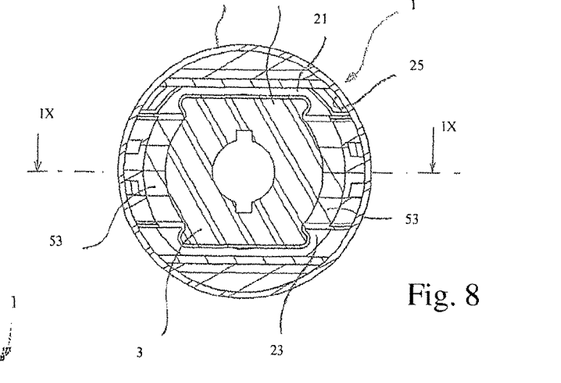
FIG. 8 is a cross-sectional view of the hydroelastic bearing shown in FIG. 7 along the cross-section line VIII-VIII.
Figure 9:
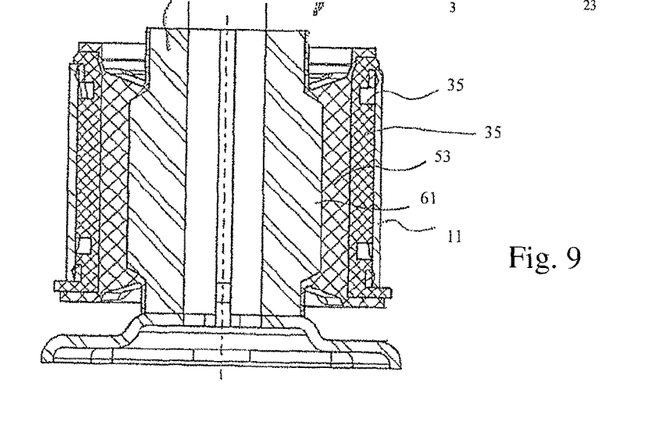
FIG. 9 is a cross-sectional view of the hydroelastic bearing shown in FIG. 8 along the cross-section line IX-IX.

In FIGS. 7, 8, and 9, a further embodiment of the hydroelastic bearing 1 is shown, wherein for improved legibility of the description of the figures the same reference numerals are used for similar or identical components.

The hydroelastic bearing 1 according to FIGS. 7 to 9 has an interior armature, on which the radial stop 31 is centrally provided opposite to a radial central projection 61 which can come into an oscillation limiting engagement with the radial stop 31.

As can be seen in FIG. 7, each respective working chamber has an H-shaped cross-section mounding to a correspondingly shaped radial aperture.

As can be seen in FIG. 7, the central projection 61 has axial undercuts 63 which serve for increasing the stop surface of the central projection 61 without increasing the axial dimension of the bearing 1. For manufacturing the working chambers 21, 23, a correspondingly shaped shaping tool is inserted through the radial passages 27 of the stiffening sleeve (support frame 7), in order to inject the elastomer material afterwards. Afterwards, the shaping tool is pulled out of both of the radial passages so that a corresponding cross-sectional shape of the working chambers 21, 23 is realized.

Figure 10:
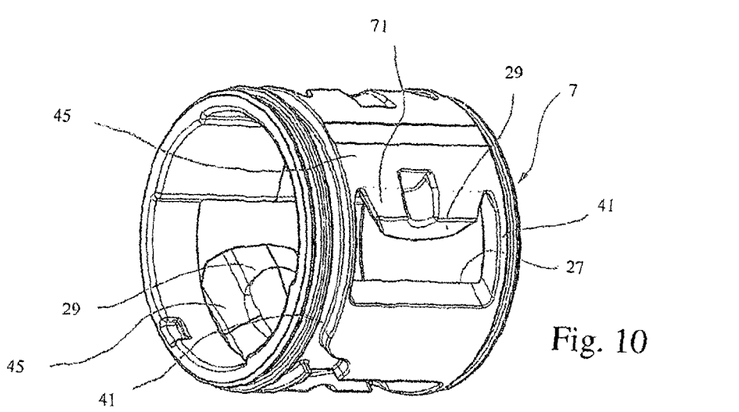
FIG. 10 is a perspective view of an exemplary sleeve-shaped support frame of the spring functional component according to a further embodiment.
Figure 11:
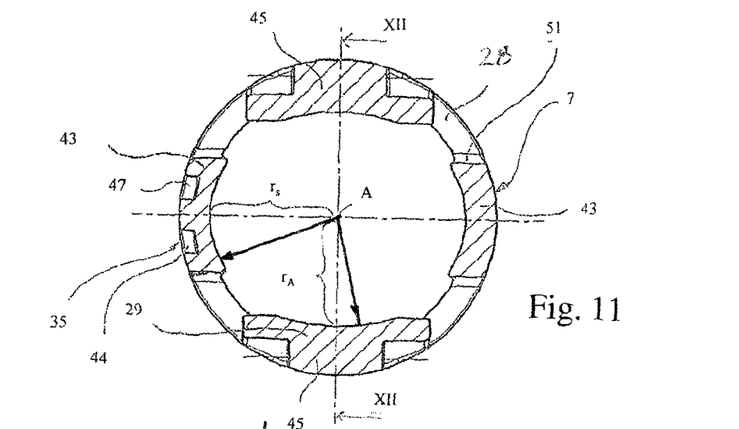
FIG. 11 is a cross-sectional view of the support frame of FIG. 10.
Figure 12:
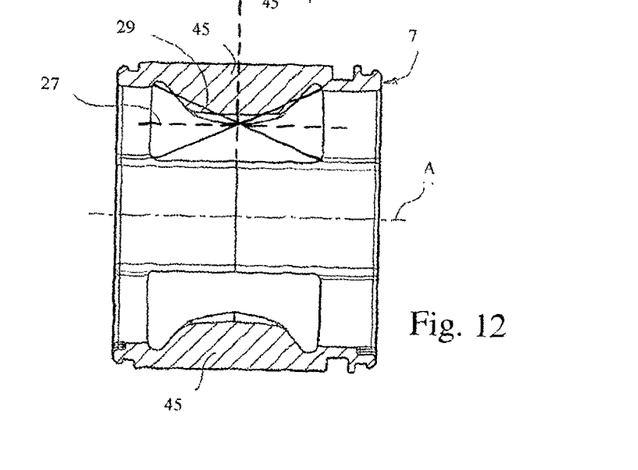
FIG. 12 is a cross-sectional view of the support frame shown in FIG. 11 along the cross-section line XII-XII.

In FIGS. 10, 11, and 12, a further embodiment of the support frame 7 of the hydroelastic spring functional component is shown, wherein, for improved legibility of the description of the figures, the same reference numerals are used for similar or identical constituents of the support frame/spring functional component.

The support frame 7 essentially corresponds to the spring functional component of FIG. 1 and is, like the above-mentioned support frames 7, an injection part made from plastic or aluminum. It is possible to provide the support frame 7 with a contour-shape which differs from a contour shape being fully rotationally symmetrical, in which advantageously radially inward protruding projections (thickenings 29) can be realized. The thickening 29, as described above, enables the reduction of the radial distance $r_A$ of the inner surface of the stop-cross-strut 45 towards the longitudinal axis A, in particular with respect to the interior sleeve 3 of the spring functional component which is not illustrated in detail, and which simultaneously enables a solid basic stop structure of larger dimensions in comparison to a smaller stop structure arranged on the radial inside, which extends from the interior sleeve 3.

A further particularity of the support frame 7 according to FIGS. 10, 11, and 12 consists in designing the cross-section of the radial passage 27 of the support frame 7 essentially U-shaped, as the stop-cross-strut 45 includes a tongue-section 71 (extending into the radial passage 27) in the circumferential direction of the sleeve-shaped support frame. The tongue-section 71 with the cylindrical outer surface thereof increases the outer contacting surface of the support frame with respect to the exterior armature (exterior sleeve) which is not indicated in detail, which exterior armature closes fluid-tight the radial passage 27 for forming the working chambers 21, 23.

The radial distance $r_A$ between the inside of the thickened stop-cross-strut 45 and the longitudinal axis A is shorter than the radial distance $r_S$ between the cylindrical inside of the support-cross-strut 43 and the longitudinal axis A.

Figure 13:
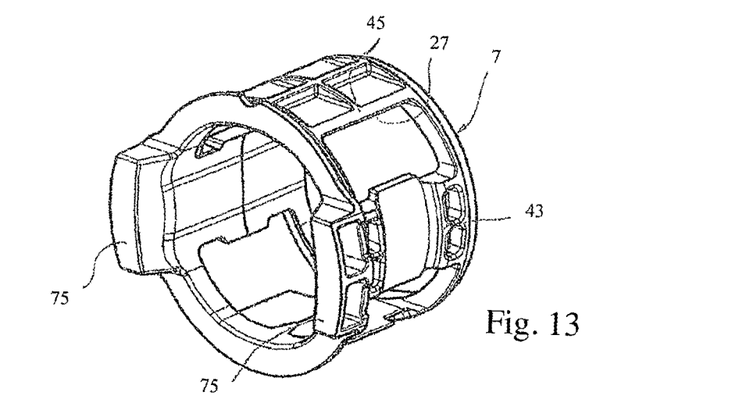
FIG. 13 is a perspective view of a further embodiment of a support frame of a functional component.
Figure 14:
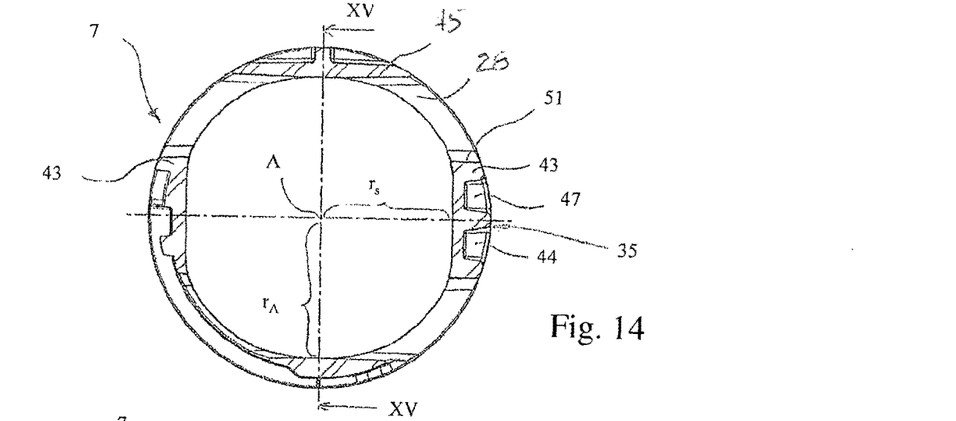
FIG. 14 is a cross-sectional view of the support frame shown in FIG. 13.
Figure 15:
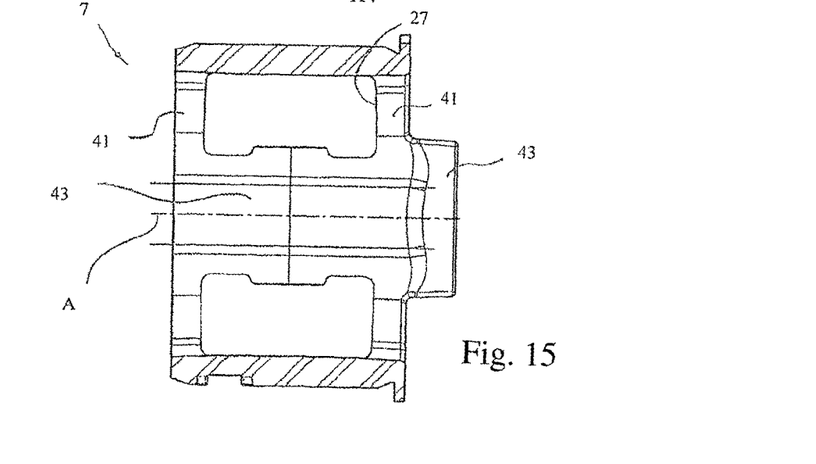
FIG. 15 is a cross-sectional view of the support frame shown in FIG. 14 along the cross-section line XV-XV.

In FIGS. 13, 14, and 15, a further embodiment of the support frame 7 of a spring functional component for a hydroelastic bearing is shown, wherein, for improved legibility of the description of the figures, the same reference numerals are used for similar or identical constituents of the support frame 7.

The support frame 7 according to FIGS. 13, 14, and 15 is an injection part, as the above-mentioned similar support frame 7, in particular a plastic injection molding part or an aluminum pressure die casting part, which can be profiled both in the radial exterior direction as well as in the radial interior direction. In the embodiment according to FIGS. 13, 14, and 15, a radial distance $r_S$ of the support-cross-strut 43 is, contrary to the above-mentioned embodiments, smaller than the radial distance $r_A$ of the stop-cross-strut 45 to the longitudinal axis A. This geometrical arrangement is made possible insofar as the stop-cross-struts 45 are formed without thickening.

In contrast to the above embodiments, the inside of the support-cross-strut 43, as well as the inside of the stop-cross-strut 45, is not formed cylindrical, but essentially flat, in particular in the area of the middle axis thereof.

In contrast to the above-mentioned support frame 7, the support frame 7 according to FIGS. 13 to 15 has axial extensions 75 protruding over the ring edge-sections 41, which extensions are arranged diametrically opposite one another and one of the axial extensions 75 including a larger axial extent in the axial direction A than the other one. The axial extensions 75 are formed in the circumferential direction at the height of the support-cross-struts 43.

The support frame 7 according to FIGS. 10, 11, and 12, as well as FIGS. 13, 14, and 15, can be manufactured correspondingly together with the spring body 5, as described above, forming the spring functional component.

The features disclosed in the afore-mentioned description, the figures and the claims can be of importance for realizing the different embodiments by themselves as well as in any combination.

REFERENCE NUMERALS 1 hydroelastic bearing
3 interior sleeve
5 elastomer spring body
7 support frame
11 exterior sleeve
13 inside
15 ribs
17, 53 spring arms
21, 23 working chamber
25 radial aperture
27 radial passage
29 thickening
30 round edge
31 radial stop
35 channel system
37 groove
39 sealing bulge
41 edge sections
43 support-cross-strut
44 channel
45 stop-cross-strut
45 stop cross strut
51 axial edge
61 projection
63 undercut
71 tongue-section
75 axial extensions
A axial direction
b clearance
$r_A$, $r_S$ radial distance

The invention claimed is:
1. A spring functional component for a hydroelastic bearing comprising:
an interior mounting connection;
an exterior mounting connection radially surrounding the interior mounting connection;
a spring body at least partially limiting at least two working chambers for receiving a dampening fluid, the at least two working chambers including a first working chamber and a second working chamber, the spring body coupling the interior mounting connection and the exterior mounting connection to one another for permitting a relative movement between the interior mounting connection and the exterior mounting connection; and a support frame of a rigid material, the support frame surrounding the interior mounting connection, wherein the first working chamber and the second working chamber each mound into at least one radial aperture being open towards the radial outside of the spring functional component, and the at least one radial aperture is closable, the support frame for each of the working chambers comprises a pair of radial passages being formed on the outside of the support frame and a first radial passage of the pair of radial passages complementary in shape with regard to the respective radial aperture, wherein the support frame has a radial inside forming a radially inward projecting thickening and a first radial stop that extends radially inward and is attached to the thickening for limiting the relative movability of the interior mounting connection and the exterior mounting connection in a radial direction, wherein the projecting thickening forms a first stop-cross-strut, wherein the spring body and the first radial stop are injected as one elastomer piece onto the support frame, wherein the first stop-cross-strut includes a tongue section extending into the first radial passage and in the circumferential direction of the support frame, the tongue section having a cylindrical outer surface increasing the outer contacting surface of the support frame with respect to the exterior mounting connection.

2. The spring functional component according to claim 1, wherein the first radial stop is made of an elastomer material injected onto the radial inside of the support frame.

3. The spring functional component according to claim 1, wherein the spring body comprises a first spring arm and a second spring arm for elastically coupling the interior mounting connection to the support frame, the first spring arm and the second spring arm extending in a radial direction from the interior mounting connection towards the radial inside of the support frame, wherein the first radial stop and an opposite-facing second radial stop are attached to the radial inside of the support frame which limit the relative movability of the interior mounting connection and the exterior mounting connection in a radial direction perpendicular with respect to the radial direction in which the first spring arm and the second spring arm extend.

4. The spring functional component according to claim 1, wherein the at least one radial aperture includes a first radial aperture, wherein the support frame at each of the working chambers comprises a pair of radial passages, the pair of radial passages being formed on an outside of the support frame, and wherein a respective course of the pair of radial passages through the support frame is congruent with the first radial aperture.

5. The spring functional component according to claim 1, wherein a cross section of each of the first working chamber and the second working chamber comprises a U-shape along an axial direction (A) of the spring functional component, the first radial stop protruding between legs thereof.

6. The spring functional component according to claim 1, wherein the support frame comprises a cylindrical bushing including two closed ring edge-sections, the ring edge-sections being rigidly coupled to one another through a plurality of cross-struts of the support frame, the plurality of cross-struts extending in an axial direction (A).

7. The spring functional component according to Claim 1, further comprising a support-cross-strut with a cylindrical inside surface.

8. The spring functional component according to claim 6, wherein a channel system for fluid communication between the working chambers is formed on a cylindrical outside of the support frame or each of the ring edge-sections comprises an annular groove on an outside formed on a terminal side thereof in the axial direction, and a radially protruding sealing bulge arranged in the annular groove.

9. The spring functional component according to claim 1, wherein at least one of the first and second working chambers is arranged axially symmetrically with respect to a longitudinal axis of the spring functional component or the working chambers at an open radial passage are closed fluid-tight by an exterior mounting connection radially surrounding the support frame on an outside of the support frame, the support frame pressed into the exterior mounting connection.

10. The spring functional component according to claim 1, wherein the interior mounting connection comprises a protrusion arranged centrally in an axial direction (A), the protrusion being arranged opposite to the first radial stop.

11. A hydroelastic bearing having a spring functional component according to claim 1, wherein the spring functional component is inserted into the exterior mounting connection such that each of the first and second working chambers are shut fluid-tight at the radial apertures thereof.

12. The spring functional component according to claim 1, wherein the first radial stop comprises a free stop end distanced from or in engagement with the interior mounting connection, dependent on a load on the spring functional component.

13. The spring functional component according to claim 1, wherein the first radial stop is arranged in each of the first and second working chambers.

14. The spring functional component according to claim 13, wherein the first radial stop is arranged in a center of the respective working chamber.

15. The spring functional component according to claim 1, wherein the support frame at each of the working chambers comprises a pair of radial passages, the pair of radial passages being formed on an outside of the support frame, and the first radial stop being arranged between the pair of radial passages.

16. The spring functional component according to claim 1, wherein the support frame comprises a cylindrical bushing including first and second closed ring edge-sections, the first and second closing ring edge-sections respectively limiting first and second radial passages in a circumferential direction.

17. The spring functional component according to claim 1, wherein the thickening is formed on an inside of the support frame in a circumferential direction.

18. The spring functional component according to claim 7, wherein the inside surface has a constant radius.

19. The spring functional component according to claim 7, wherein a radius of the inside surface corresponds to a radial distance to a longitudinal axis of the spring functional component.

20. The spring functional component according to claim 7, wherein a radial distance between the stop-cross-strut and a longitudinal axis of the spring functional component is shorter than a radial distance between a cylindrical inside of the support-cross-strut and the longitudinal axis.

21. A hydroelastic bearing, comprising:
an interior sleeve;
an exterior sleeve radially surrounding the interior sleeve;
an elastomer spring body coupling the interior sleeve to the exterior sleeve for permitting relative movement between the interior sleeve and the exterior sleeve, the elastomer spring body including at least two working chambers for receiving a dampening fluid, the at least two working chambers including a first working chamber and a second working chamber, wherein each of the first and second working chambers mounds into a respective radial aperture, the respective radial aperture closable with the elastomer spring body coupled to the exterior sleeve; and
a support frame of a rigid material, the support frame surrounding the interior sleeve and having a radial outside surface and a radial inside surface forming a radially inward projecting thickening and a radial stop extending radially inward, the radial stop being attached to the thickening for limiting the relative movement between the interior sleeve and the exterior sleeve in a radial direction, the support frame including a pair of radial passages for each of the first and second working chambers, the pair of radial passages being formed through a thickness of the support frame,
wherein the inward projecting thickening forms a respective stop-cross-strut, the stop-cross-strut including a tongue section extending into the radial passage and in the circumferential direction of the support frame, the tongue section having a cylindrical outer surface increasing the outer contacting surface of the support frame with respect to the exterior sleeve.

* * * * *